(12) United States Patent
Park et al.

(10) Patent No.: US 9,544,119 B2
(45) Date of Patent: Jan. 10, 2017

(54) METHOD AND DEVICE FOR TRANSMITTING/OBTAINING CONTROL INFORMATION IN WIRELESS COMMUNICATION SYSTEM

(71) Applicant: LG ELECTRONICS INC., Seoul (KR)

(72) Inventors: Kyujin Park, Anyang-si (KR); Hangyu Cho, Anyang-si (KR); Hyunsoo Ko, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 29 days.

(21) Appl. No.: 14/240,000

(22) PCT Filed: Nov. 21, 2012

(86) PCT No.: PCT/KR2012/009864
§ 371 (c)(1),
(2) Date: Feb. 20, 2014

(87) PCT Pub. No.: WO2013/077625
PCT Pub. Date: May 30, 2013

(65) Prior Publication Data
US 2014/0185578 A1 Jul. 3, 2014

Related U.S. Application Data

(60) Provisional application No. 61/563,496, filed on Nov. 23, 2011.

(51) Int. Cl.
*H04W 72/04* (2009.01)
*H04L 5/00* (2006.01)
(Continued)

(52) U.S. Cl.
CPC ........... *H04L 5/0053* (2013.01); *H04L 1/0038* (2013.01); *H04L 1/0046* (2013.01); *H04L 5/0007* (2013.01);
(Continued)

(58) Field of Classification Search
CPC ............ H04W 72/042; H04W 72/0413; H04L 5/0053; H04L 5/0048
See application file for complete search history.

(56) References Cited

U.S. PATENT DOCUMENTS

2010/0279628 A1* 11/2010 Love et al. ............... 455/70
2011/0170496 A1* 7/2011 Fong et al. ............... 370/329
(Continued)

FOREIGN PATENT DOCUMENTS

CN 102202324 9/2011
EP 2670065 12/2013
(Continued)

OTHER PUBLICATIONS

Motorola Mobility, "E-PDCCH Design Aspects," 3GPP TSG RAN WG1 #67, R1-114029, Nov. 2011, 4 pages.
(Continued)

*Primary Examiner* — Fan Ng
(74) *Attorney, Agent, or Firm* — Lee Hong Degerman Kang & Waimey

(57) ABSTRACT

An embodiment of the present invention relates to a method of obtaining control information through an enhanced physical downlink control channel (E-PDCCH) by a terminal in a wireless communication system. The method includes performing blind decoding on a common searching space in a set of first resource blocks on a subframe; and performing blind decoding on a terminal-specific searching space in a set of second resource blocks on the subframe, wherein a first start orthogonal frequency division multiplexing
(Continued)

(a)

(b)

(OFDM) symbol of an E-PDCCH resource region including the common searching space in the set of first resource blocks and a second start OFDM symbol of an E-PDCCH resource region including the terminal-specific searching space in the set of second resource blocks are set individually.

12 Claims, 11 Drawing Sheets

(51) Int. Cl.
*H04L 1/00* (2006.01)
*H04L 27/26* (2006.01)

(52) U.S. Cl.
CPC ............ *H04L 5/0023* (2013.01); *H04L 5/0094* (2013.01); *H04L 27/2666* (2013.01)

(56) References Cited

U.S. PATENT DOCUMENTS

2011/0211519 A1* 9/2011 Katayama et al. ............ 370/312
2013/0039284 A1* 2/2013 Marinier et al. .............. 370/329

FOREIGN PATENT DOCUMENTS

| EP | 2775768 | 9/2014 |
|---|---|---|
| JP | 2014-508471 | 4/2014 |
| JP | 2014-523676 | 9/2014 |
| JP | 2014-529939 | 11/2014 |
| KR | 10-2010-0019957 | 2/2010 |
| KR | 10-2010-0099655 | 9/2010 |
| WO | 2010/101366 | 9/2010 |
| WO | 2011/025195 | 3/2011 |

OTHER PUBLICATIONS

PCT International Application No. PCT/KR2012/009864, Written Opinion of the International Searching Authority dated Feb. 25, 2013, 16 pages.

CATT, "Design of E-PDCCH search space," 3GPP TSG RAN WG1 Meeting #67, R1-113743, Nov. 2011, 3 pages.

LG Electronics, "Search space design for enhanced PDCCH," 3GPP TSG RAN WG1 Meeting #67, R1-113917, Nov. 2011, 3 pages.

Alcatel-Lucent Shanghai Bell, et al., "Search Space for ePDCCH," 3GPP TSG RAN WG1 Meeting #67, R1-114065, Nov. 2011, 2 pages.

PCT International Application No. PCT/KR2012/009864, Written Opinion of the International Searching Authority dated Feb. 25, 2013, 11 pages.

The State Intellectual Property Office of the People's Republic of China Application Serial No. 201280057384.X, Office Action dated Jun. 2, 2016, 13 pages.

European Patent Office Application Serial No. 12852056.6, Search Report dated Jul. 15, 2015, 9 pages.

* cited by examiner

METHOD AND DEVICE FOR TRANSMITTING/OBTAINING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/009864, filed on Nov. 21, 2012, which claims the benefit of U.S. Provisional Application Ser. No. 61/563,496, filed on Nov. 23, 2011, the contents of which are all hereby incorporated by reference herein in their entirety.

TECHNICAL FIELD

The present invention relates to a method and apparatus for transmitting/obtaining control information in a wireless communication system.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE

Technical Problem

The present invention relates to a method and apparatus for transmitting/receiving control information. More particularly, the present invention relates to, if control information is transmitted on an Enhanced Physical Downlink Control Channel (E-PDCCH), determination of a starting Orthogonal Frequency Division Multiplexing (OFDM) symbol of a resource region in which the E-PDCCH is transmitted.

It will be appreciated by persons skilled in the art that the objects that could be achieved with the present invention are not limited to what has been particularly described hereinabove and the above and other objects that the present invention could achieve will be more clearly understood from the following detailed description.

Technical

In an aspect of the present invention, a method for acquiring control information on an Enhanced Physical Downlink Control Channel (E-PDCCH) at a User Equipment (UE) in a wireless communication system includes performing blind decoding on a common search space in a set of first Resource Blocks (RBs) of a subframe, and performing blind decoding on a UE-specific search space in a set of second RBs of the subframe. A first start OFDM symbol of an E-PDCCH resource region including the common search space in the set of first RBs and a second start OFDM symbol of an E-PDCCH resource region including the UE-specific search space in the set of second RBs are determined separately.

In another aspect of the present invention, a method for transmitting control information on an E-PDCCH at a BS in a wireless communication system includes allocating a common search space in a set of first RBs of a subframe, and allocating a UE-specific search space in a set of second RBs of the subframe. A first start OFDM symbol of an E-PDCCH resource region including the common search space in the set of first RBs and a second start OFDM symbol of an E-PDCCH resource region including the UE-specific search space in the set of second RBs are determined separately.

In another aspect of the present invention, a UE for acquiring control information on an E-PDCCH in a wireless communication system includes a reception module, and a processor. The processor performs blind decoding on a common search space in a set of first RBs of a subframe and performs blind decoding on a UE-specific search space in a set of second RBs of the subframe. A first start OFDM symbol of an E-PDCCH resource region including the common search space in the set of first RBs and a second start OFDM symbol of an E-PDCCH resource region including the UE-specific search space in the set of second RBs are determined separately.

In a further aspect of the present invention, a BS for transmitting control information on an E-PDCCH in a wireless communication system includes a transmission module, and a processor. The processor allocates a common search space in a set of first RBs of a subframe and allocates a UE-specific search space in a set of second RBs of the subframe. A first start OFDM symbol of an E-PDCCH resource region including the common search space in the set of first RBs and a second start OFDM symbol of an E-PDCCH resource region including the UE-specific search space in the set of second RBs are determined separately.

The first and second aspects of the present invention may include all or a part of the followings.

The index of the first start OFDM symbol may be fixed to 4.

The index of the second start OFDM symbol may be determined based on at least one of a type of the subframe or a higher-layer signaled value. If the subframe is a normal subframe, the index of the second start OFDM symbol may be the higher-layer signaled value. If the subframe is one of a special subframe or a Multicast-Broadcast Single Frequency Network (MBSFN) subframe and includes more than 10 RBs, the index of the second start OFDM symbol may be a smaller value between 2 and the higher-layer signaled value. If the subframe is one of a special subframe or an MBSFN subframe and includes 10 or fewer RBs, the index of the second start OFDM symbol may be 2.

Advantageous Effects

According to the present invention, when control information is transmitted on an Enhanced Physical Downlink Control Channel (E-PDCCH), a start OFDM symbol of a resource region carrying the E-PDCCH is defined. Therefore, a User Equipment (UE) can perform blind decoding without ambiguity.

It will be appreciated by persons skilled in the art that the effects that can be achieved with the present invention are not limited to what has been particularly described hereinabove and other advantages of the present invention will be

BEST MODE

Figure 1:
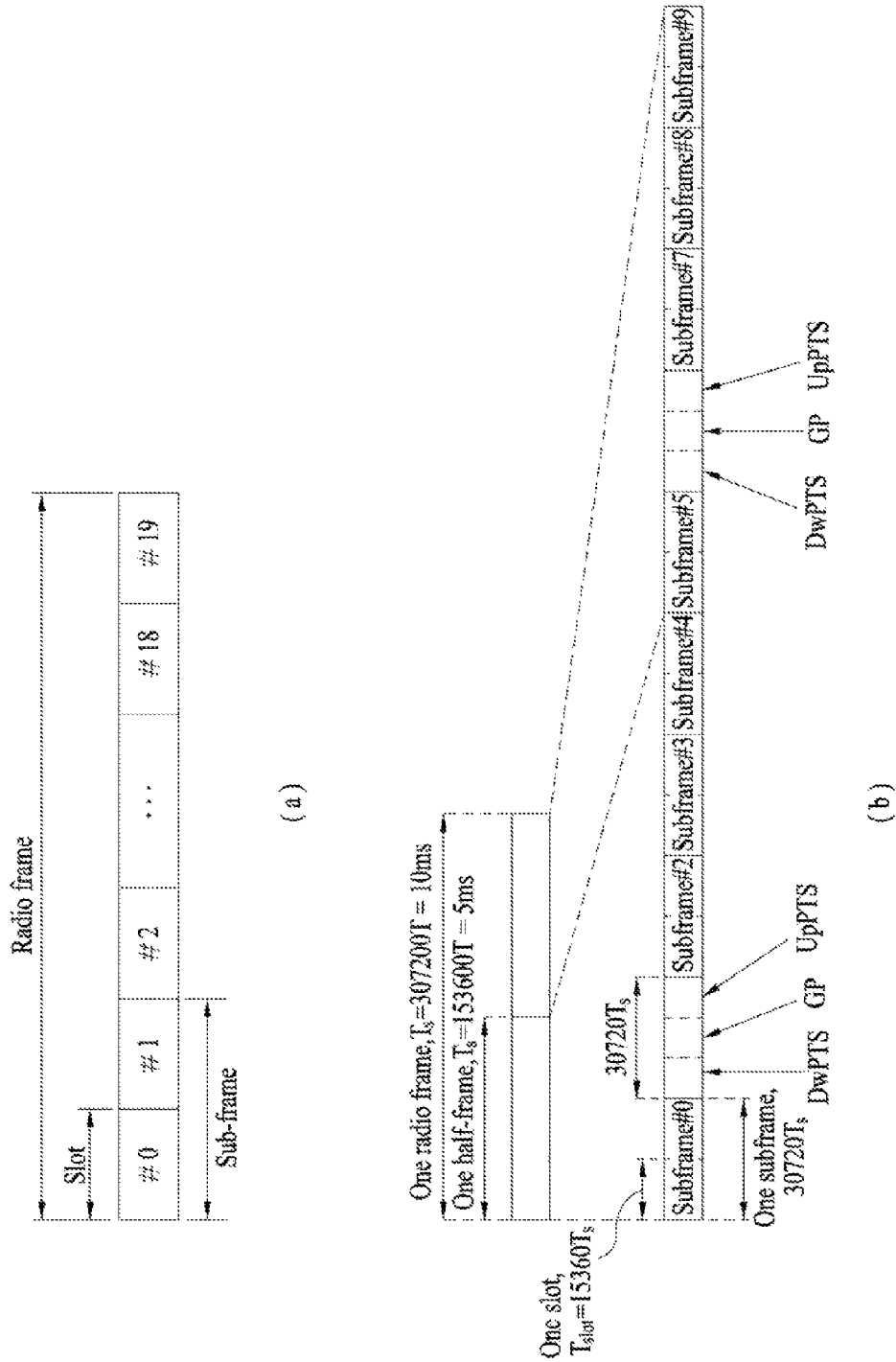
FIG. 1 illustrates a structure of a downlink radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, the present disclosure focuses on the 3GPP LTE and LTE-A systems. However, the technical features of the present invention are not limited thereto.

FIG. 1 illustrates a radio frame structure in a 3GPP LTE system. Referring to FIG. 1(a), a radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for DL, an OFDM symbol represents one symbol period. An OFDM symbol may be referred to as an SC-FDMA symbol or symbol period on UL. A Resource Block (RB) is a resource allocation unit including a plurality of contiguous subcarriers in a slot. This radio frame structure is purely exemplary. Therefore, the number of subframes in a radio frame, the number of slots in a subframe, or the number of OFDM symbols in a slot may vary.

FIG. 1(b) illustrates a type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of UL transmission synchronization to a UE at an eNB. The GP is a period between a UL and a DL, which eliminates UL interference caused by multipath delay of a DL signal.

The above-described radio frame structure is purely exemplary and thus it is to be noted that the number of subframes in a radio frame, the number of slots in a subframe, or the number of symbols in a slot may vary.

Figure 2:
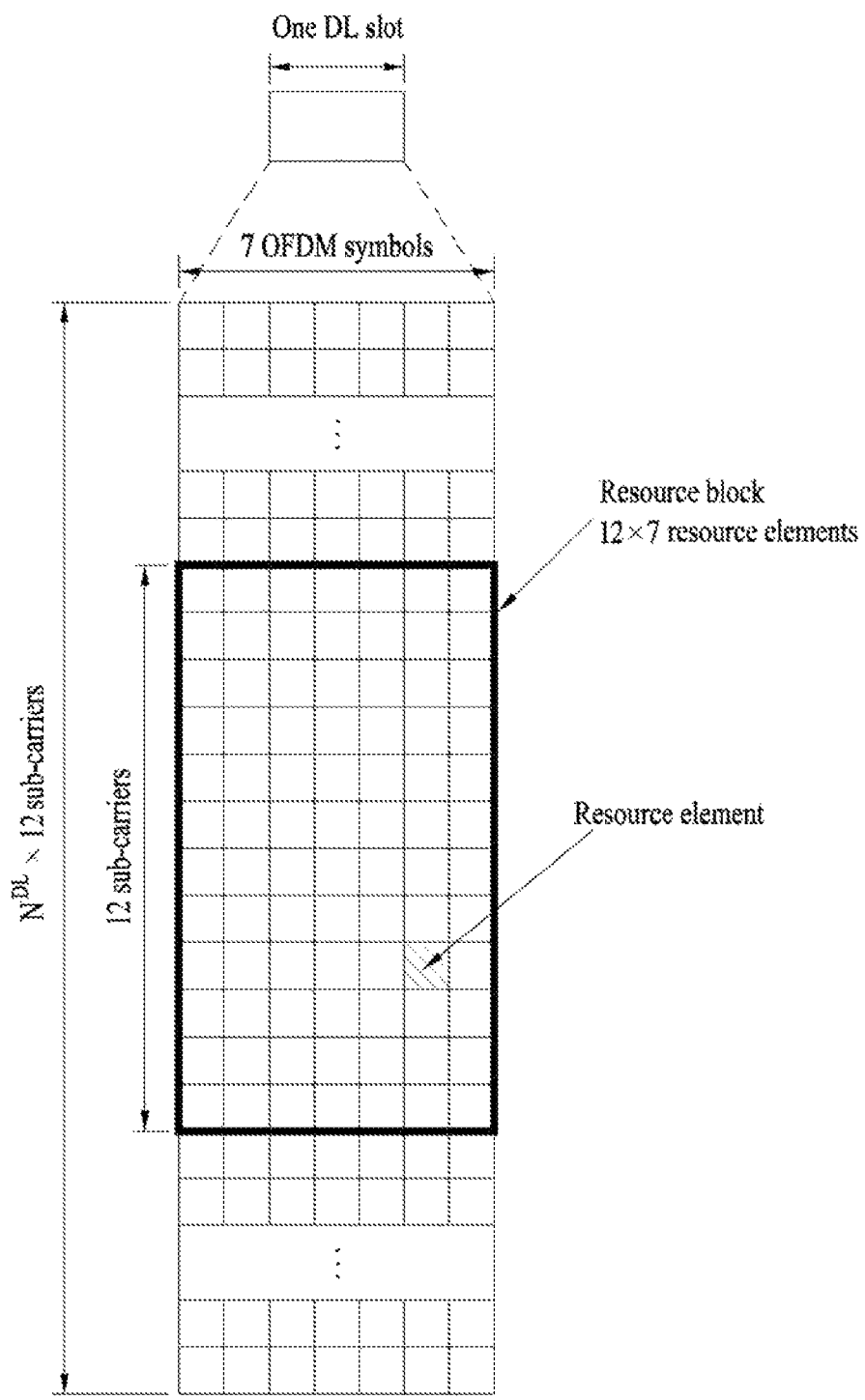
FIG. 2 illustrates an exemplary resource grid for the duration of one downlink slot.

FIG. 2 illustrates a resource grid for the duration of one DL slot. A DL slot includes 7 OFDM symbols in the time domain and an RB includes 12 subcarriers in the frequency domain, which does not limit the scope and spirit of the present invention. For example, a DL slot may include 7 OFDM symbols in the case of a normal Cyclic Prefix (CP), whereas a DL slot may include 6 OFDM symbols in the case of an extended CP. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 3:
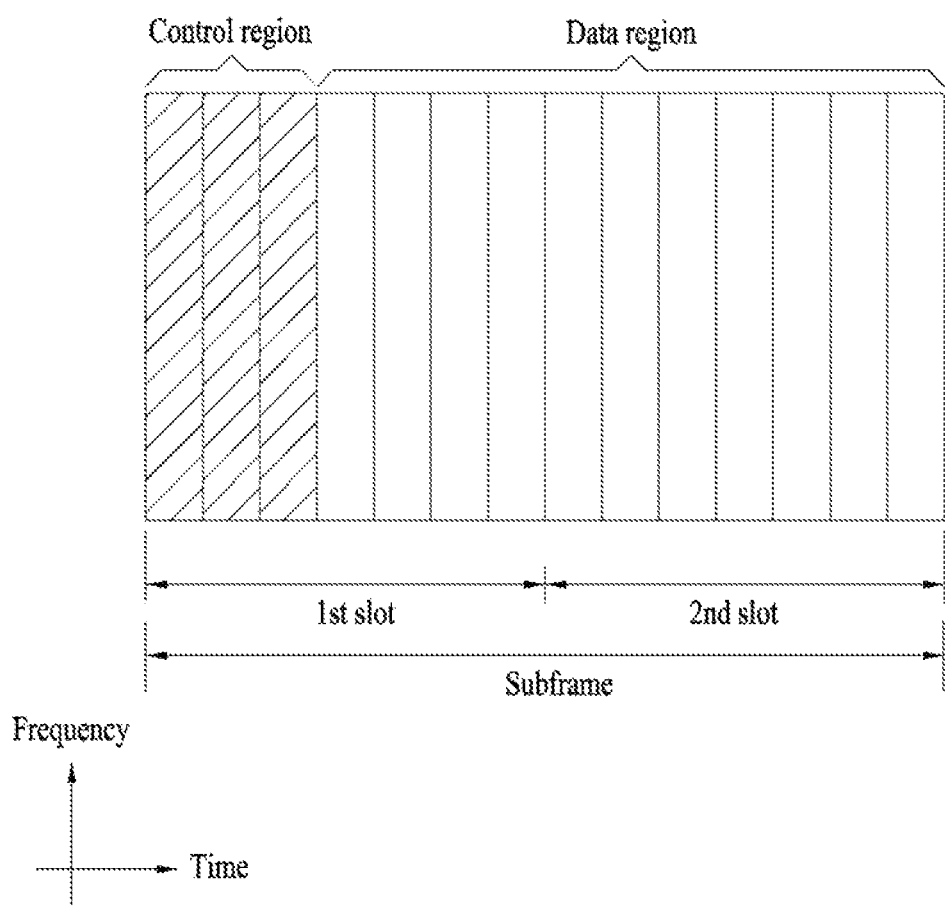
FIG. 3 illustrates a structure of a downlink subframe.

FIG. 3 illustrates a DL subframe structure. Up to 3 OFDM symbols at the start of the first slot of a DL subframe are used for a control region to which control channels are allocated and the other OFDM symbols of the DL subframe are used for a data region to which a Physical Downlink Shared Channel (PDSCH) is allocated. DL control channels used in the 3GPP LTE system include Physical Control Format Indicator Channel (PCFICH), Physical Downlink Control Channel (PDCCH), and Physical Hybrid automatic repeat request (HARQ) Indicator Channel (PHICH).

The PCFICH is transmitted in the first OFDM symbol of a subframe, carrying information about the number of OFDM symbols used for transmission of control channels in the subframe.

The PHICH delivers an HARQ ACKnowledgment/Negative ACKnowledgment (ACK/NACK) signal in response to a UL transmission.

Control information transmitted on the PDCCH is called Downlink Control Information (DCI). The DCI transports UL or DL scheduling information, or UL Transmit Power Control (TPC) commands for UE groups. The PDCCH delivers information about resource allocation and a transport format for a Downlink Shared Channel (DL-SCH), information about resource allocation for an Uplink Shared Channel (UL-SCH), paging information of a Paging Channel (PCH), system information on the DL-SCH, information about resource allocation for a higher-layer control message such as a Random Access Response transmitted on the PDSCH, a set of TPC commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is transmitted in an aggregate of one or more contiguous Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the correlation between the number of CCEs and a coding rate provided by the CCEs. An eNB determines a PDCCH format according to DCI transmitted to a UE and adds a Cyclic Redundancy Check (CRC) to control information. The CRC is masked by an Identifier (ID) known as Radio Network Temporary Identifier (RNTI) according to the owner or usage of the PDCCH. If the PDCCH is directed to a specific UE, its CRC may be masked by a Cell-RNTI (C-RNTI) of the UE. If the PDCCH is used for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
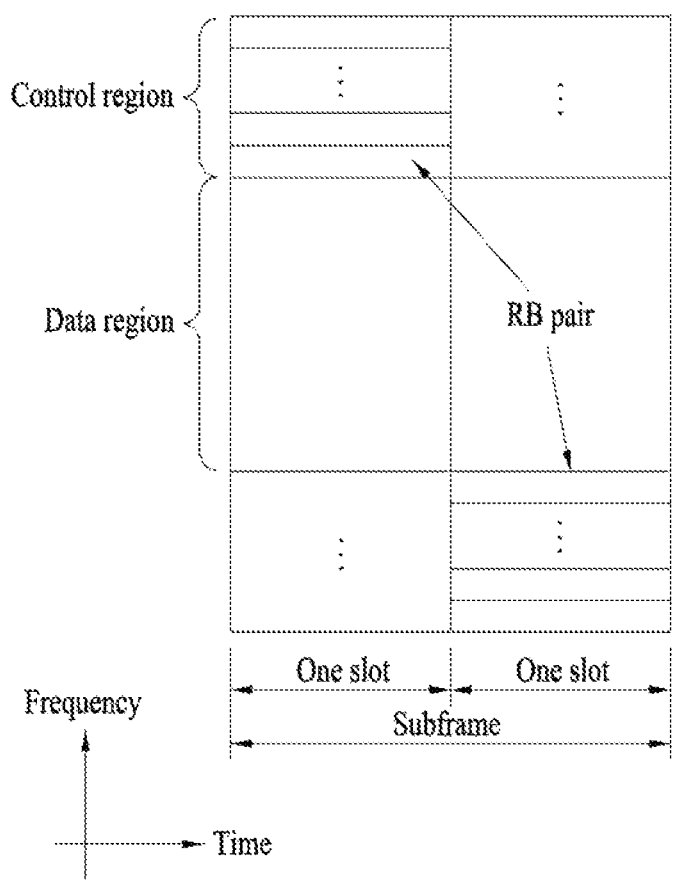
FIG. 4 illustrates a structure of an uplink subframe.

FIG. 4 illustrates a UL subframe structure. A UL subframe may be divided into a control region and a data region in the frequency domain. A Physical Uplink Control Channel (PUCCH) carrying Uplink Control Information (UCI) is allocated to the control region and a Physical Uplink Shared Channel (PUSCH) carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in the two slots of the subframe. Thus it is said that the RB pair allocated to the PUCCH is frequency-hopped over a slot boundary.

DCI Formats

LTE-A (release 10) defines DCI formats 0, 1, 1A, 1B, 1C, 1D, 2, 2A, 2B, 2C, 3, 3A, and 4. DCI formats 0, 1A, 3, and 3A have the same message size to reduce the number of blind decodings as described later. According to the usages of control information transmitted in these DCI formats, the DCI formats are classified into i) DCI formats 0 and 4 used for a UL grant, ii) DCI formats 1, 1A, 1B, 1C, 1D, 2, 2A, 2B, and 2C used for DL scheduling assignments, and iii) DCI formats 3 and 3A used for transmitting TPC commands.

DCI format 0 used for transmission of a UL grant may include a carrier offset required for later-described Carrier Aggregation (CA) (carrier indicator), an offset that differentiates DCI format 0 from DCI format 1A (flag for format 0/format 1A differentiation), a flag indicating whether frequency hopping applies to PUSCH transmission (frequency hopping flag), information about allocation of RBs to PUSCH transmission of a UE (frequency hopping flag), a Modulation and Coding Scheme (MCS), a new data indicator used to flush a buffer for an initial transmission in relation to an HARQ process, a TPC command for a scheduled PUSCH, cyclic shift information about a Demodulation Reference Signal (DMRS) (cyclic shift for DMRS and Orthogonal Code Cover (OCC) index), a UL index required for a Time Division Duplexing (TDD) operation, Channel Quality Indicator (CQI) request information (CSI request), etc. Because DCI format 0 uses synchronous HARQ, DCI format 0 does not include a Redundancy Version (RV), compared to the DCI formats related to DL scheduling assignments. If cross carrier scheduling is not used, the carrier indicator is not included in the DCI format.

DCI format 4 is added to LTE-A release 10, with the aim to support spatial multiplexing for UL transmission. Compared to DCI format 0, DCI format 4 further includes spatial multiplexing information, thus having a relatively large message size. In addition to control information included in DCI format 0, DCI format 4 further includes other control information. Specifically, DCI format 4 further includes an MCS for a second transport block, precoding information for Multiple Input Multiple Output (MIMO) transmission, and a Sounding Reference Signal (SRS) request. Because DCI format 4 is larger than DCI format 0 in size, DCI format 4 does not include a flag for format 0/format 1A differentiation.

Among DCI formats 1, 1A, 1B, 1C, 1D, 2, 2A, 2B, and 2C related to DL scheduling assignments, DCI formats 1, 1A, 1B, 1C, and 1D do not support spatial multiplexing, whereas DCI formats 2, 2A, 2B, and 2C support spatial multiplexing.

DCI format 1C supports only contiguous frequency allocation as a compact DL assignment. Compared to other DCI formats, DCI format 1C does not include a carrier indicator and an RV.

DCI format 1A is used for DL scheduling and a random access procedure. DCI format 1A may include a carrier indicator, an indicator indicating whether distributed DL transmission is used, PDSCH resource allocation information, an MCS, an RV, an HARQ process number indicating a processor used for soft combining, a new data indicator used to flush a buffer for an initial transmission in relation to an HARQ process, a TPC command for a PUCCH, a UL index required for a TDD operation, etc.

Control information of DCI format 1 is mostly similar to control information of DCI format 1A except that DCI format 1 is related to contiguous resource allocation and DCI format 1A supports non-contiguous resource allocation. Accordingly, DCI format 1 further includes a resource allocation header, thereby increasing control signaling overhead as a trade-off of an increase in resource allocation flexibility.

DCI formats 1B and 1D are common in that they further include precoding information, compared to DCI format 1. DCI format 1B carries Precoding Matrix Index (PMI) confirmation and DCI format 1D carries DL power offset information. Other control information included in DCI formats 1B and 1D is mostly identical to control information of DCI format 1A.

DCI formats 2, 2A, 2B, and 2C basically include most of the control information included in DCI format 1A and further include spatial multiplexing information. The spatial multiplexing information includes an MCS for a second transport block, a new data indicator, and an RV.

DCI format 2 supports closed-loop spatial multiplexing and DCI format 2A supports open-loop spatial multiplexing. Both DCI formats 2 and 2A include precoding information. DCI format 2B supports dual-layer spatial multiplexing combined with beamforming, further including cyclic shift information for DMRS. DCI format 2C is an extension of DCI format 2B, supporting spatial multiplexing of up to 8 layers.

DCI formats 3 and 3A may be used to support TPC information included in the DCI formats used for transmission of a UL grant and DL scheduling assignments, for semi-persistent scheduling. A 1-bit command is used per UE in DCI format 3 and a 2-bit command is used per UE in DCI format 3A.

One of the above-described DCI formats may be transmitted on one PDCCH and a plurality of PDCCHs may be transmitted in the control region of a subframe. A UE may monitor a plurality of PDCCHs.

Configuration of DL Control Channels

Basically, DL control channels may be transmitted in the first 3 OFDM symbols of each subframe. One to three OFDM symbols may be used according to the overhead of DL control channels. To adjust the number of OFDM symbols for DL control channels in each subframe, a PCFICH may be used. A PHICH may carry an ACK/NACK on a DL in response to a UL transmission. A PDCCH may deliver control information required for DL or UL data transmission.

Figure 5:
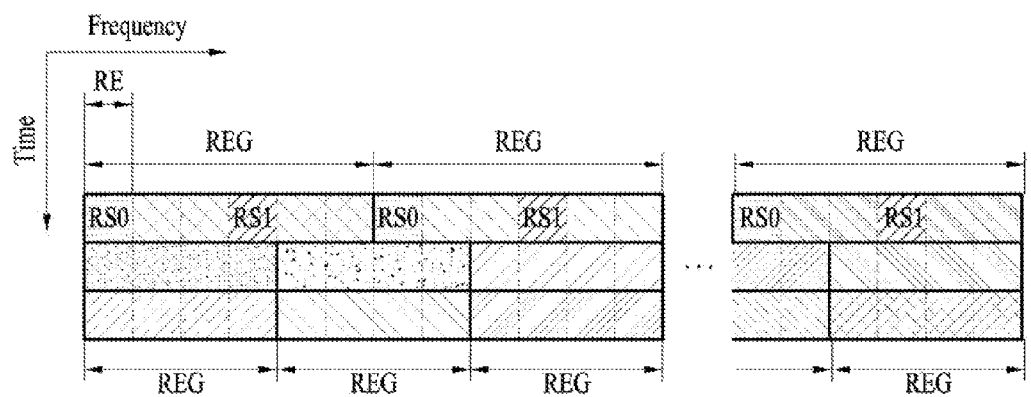
FIGS. 5 and 6 are views referred to for describing a downlink control channel allocation unit, Resource Element Group (REG)
Figure 6:
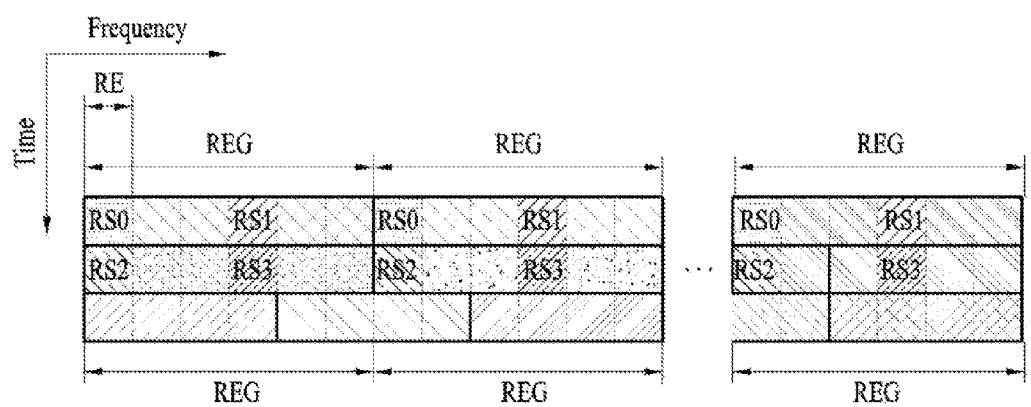

FIGS. 5 and 6 illustrate allocation of the above-described control channels in units of an REG in the control region of each subframe. FIG. 5 illustrates a system with a 1 Transmission (1Tx) or 2Tx antenna configuration and FIG. 6 illustrates a system with a 4Tx antenna configuration. As illustrated in FIGS. 5 and 6, a basic resource unit of allocating a control channel, REG includes 4 contiguous REs except for REs carrying RSs in the frequency domain. A predetermined number of REGs may be used to transmit a DL control channel according to the overhead of the DL control channel.

Physical Control Format Indicator Channel (PCFICH)

The PDCCH may be transmitted in OFDM symbols ranging from OFDM symbol 0 to OFDM symbol 2 of each subframe to provide resource allocation information about the subframe. Depending on the overhead of the PDCCH, the PDCCH may be transmitted in OFDM symbol 0, in OFDM symbol 0 and OFDM symbol 1, and in OFDM symbol 0, OFDM symbol 1, and OFDM symbol 2. The number of OFDM symbols for a control channel may be changed in each subframe and this information may be provided through the PCFICH. Accordingly, the PCFICH should be transmitted in every subframe.

The PCFICH may provide three pieces of information. [Table 1] below lists the Control Format Indicator (CFI) values of the PCFICH. If the CFI is 1, this implies that the PDCCH is transmitted in OFDM symbol 0. If the CFI is 2, this implies that the PDCCH is transmitted in OFDM symbol 0 and OFDM symbol 1. If the CFI is 3, this implies that the PDCCH is transmitted in OFDM symbol 0, OFDM symbol 1, and OFDM symbol 2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information delivered on the PCFICH may be defined differently according to a system bandwidth. For example, if the system bandwidth is narrower than a specific threshold, the CFIs of 1, 2, and 3 may mean that the PDCCH is transmitted in 2, 3, and 4 OFDM symbols, respectively.

Figure 7:
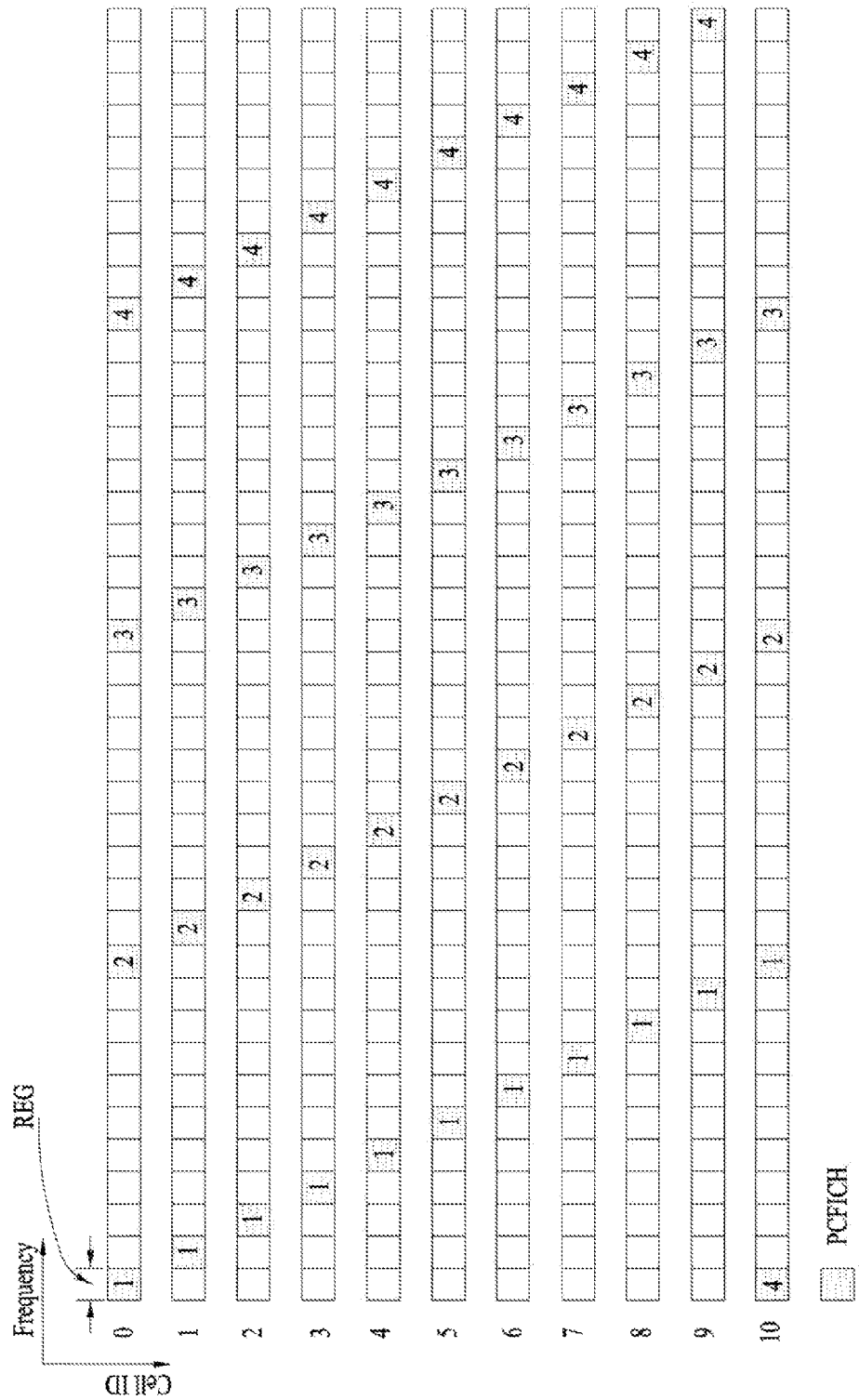
FIG. 7 illustrates a Physical Control Format Indicator Channel (PCFICH) transmission scheme.

FIG. 7 illustrates a PCFICH transmission scheme. Referring to FIG. 7, an REG includes 4 subcarriers which are data subcarriers other than RS REs. In general, transmit diversity may apply to the REG. The REG may be shifted in frequency in each cell (i.e. according to a cell ID) to prevent inter-cell interference. The PCFICH is always transmitted in the first OFDM symbol (OFDM symbol 0) of a subframe. Therefore, upon receipt of a subframe, a receiver may determine the number of OFDM symbols occupied by the PDCCH by detecting information from the PCFICH in the subframe, and then may receive control information on the PDCCH.

Physical Hybrid-ARQ Indicator Channel (PHICH)

Figure 8:
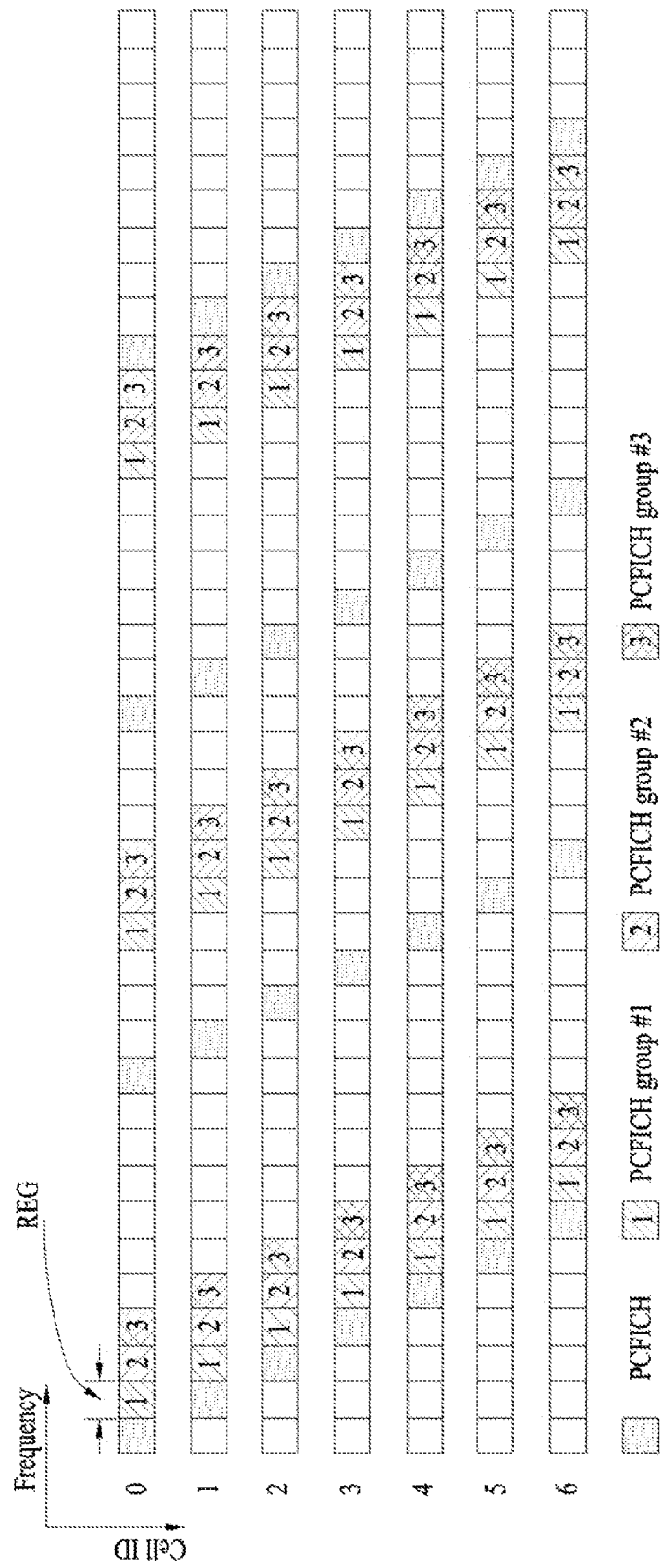
FIG. 8 illustrates the positions of a PCFICH and Physical HARQ Indicator Channels (PHICHs)

FIG. 8 illustrates general positions of a PCFICH and PHICHs in a specific bandwidth. A PHICH delivers an ACK/NACK for a UL data transmission. A plurality of PHICH groups are formed in one subframe and one PHICH group includes a plurality of PHICHs. Accordingly, one PHICH group includes PHICHs for a plurality of UEs.

As illustrated in FIG. 8, a PHICH for each UE in the plurality of PHICH groups is allocated by a lowest Physical RB (PRB) index of a PUSCH resource allocation and a DMRS cyclic shift indicated by a UL grant on a PDCCH. A DMRS is a UL reference signal transmitted along with a UL signal, for channel estimation by which to demodulate UL data. PHICH resources are indicated by an index pair such as $(n_{PHICH}^{group}, n_{PHICH}^{seq})$. In the index pair $(n_{PHICH}^{group}, n_{PHICH}^{seq})$, $n_{PHICH}^{group}$ is a PHICH group number and $n_{PHICH}^{seq}$ is an orthogonal sequence index in a PHICH group with the PHICH group number. $n_{PHICH}^{group}$ and $n_{PHICH}^{seq}$ are determined by [Equation 1].

$$(n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ [Equation 1]

where $n_{DMRS}$ is a cyclic shift value for DMRSs used in a UL transmission associated with the PHICH, mapped to a value of the 'cyclic shift for DMRS' field of the latest UL grant control information (e.g., DCI format 0/4) for a transport block related to a corresponding PUSCH transmission. For example, the 'cyclic shift for DMRS' field of the latest DCI format for a UL grant may be 3 bits in size. If this field has value '000', $n_{DMRS}$ may be set to '0'.

In [Equation 1], $N_{SF}^{PHICH}$ is a Spreading Factor (SF) size used for PHICH modulation, and $I_{PRB\_RA}^{lowest\_index}$ is a lowest PRB index of the first slot of the PUSCH transmission. $I_{PHICH}$ is 1 only in a special case in a TDD system (when UL/DL configuration 0 is set and a PUSCH is transmitted in a subframe corresponding to n=4 or 9) and otherwise, $I_{PHICH}$ is 0. $N_{PHICH}^{group}$ is the number of PHICH groups configured by a high layer, calculated by [Equation 2].

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases}$$ [Equation 2]

where $N_g$ is information about the amount of PHICH resources, expressed in 2 bits transmitted on a Physical Broadcast Channel (PBCH) ($N_g \in \{1/6, 1/2, 1, 2\}$) and $N_{RB}^{DL}$ is the number of DL RBs.

[Table 2] illustrates exemplary orthogonal sequences defined in the legacy 3GPP LTE release-8/release-9.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1 ] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
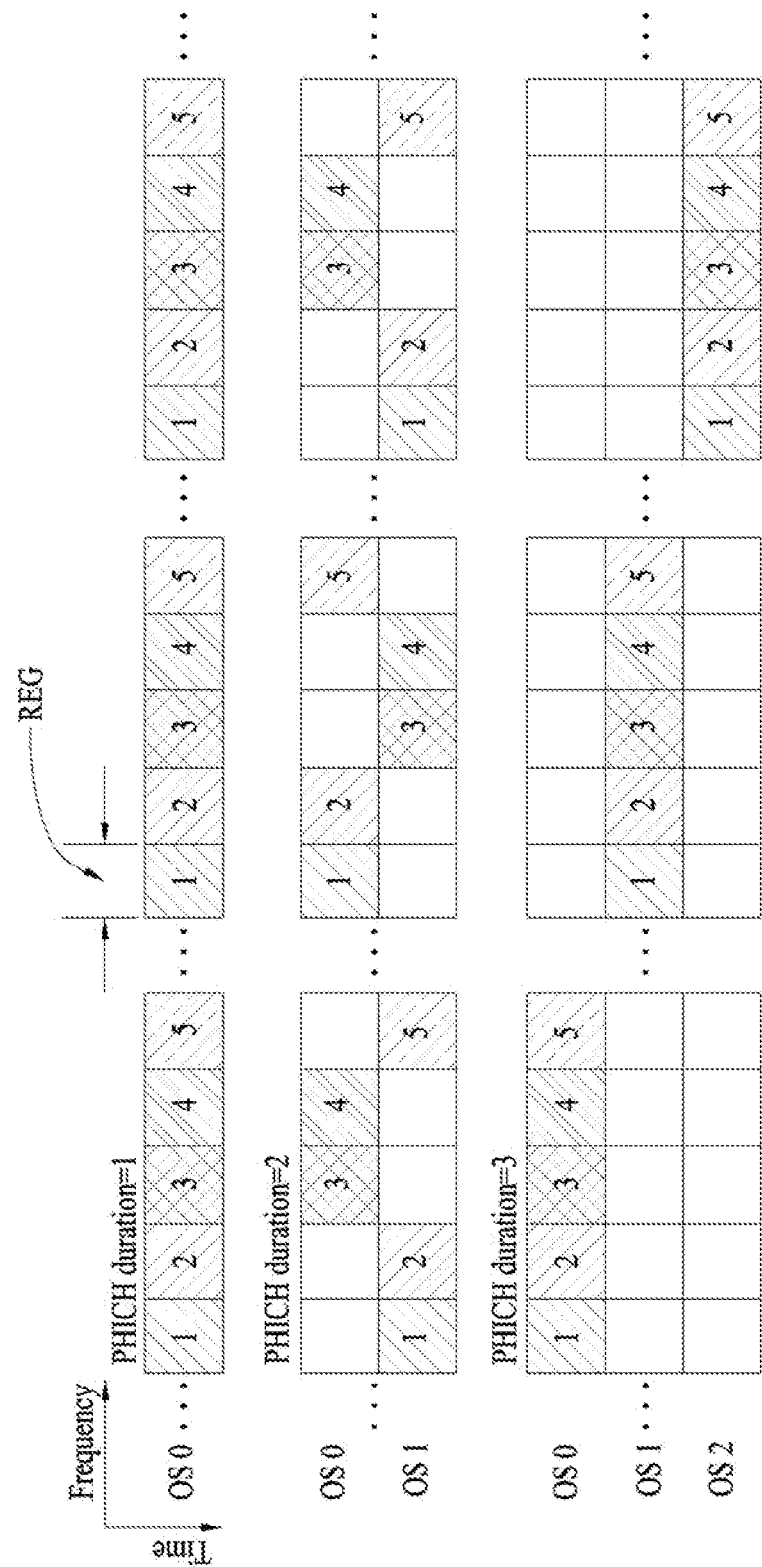
FIG. 9 illustrates the positions of downlink Resource Elements (REs) to which PHICH groups are mapped.

FIG. 9 illustrates the positions of DL REs to which PHICH groups are mapped. A PHICH group may be configured in a different time area (i.e. a different OFDM Symbol (OS)) in a subframe according to a PHICH duration, as illustrated in FIG. 9.

PDCCH Processing

PDCCH-RE mapping is performed in CCEs, which are contiguous logical allocation units. One CCE includes a plurality of (e.g. 9) REGs, each REG having four adjacent REs except for RS REs.

The number of CCEs required for a specific PDCCH depends on DCI payload (i.e. a control information size), a cell bandwidth, a channel coding rate, etc. Specifically, the number of CCEs for a specific PDCCH may be defined according to a PDCCH format, as illustrated in [Table 3].

TABLE 3

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described before, one of the above four formats is used for a PDCCH, which is not known to a UE. Therefore, the UE should decode the PDCCH without knowledge of the PDCCH format. This is called blind decoding. However, because decoding of all possible DL CCEs for each PDCCH format may impose a great constraint on the UE, a search space is defined in consideration of scheduler restrictions and the number of decoding attempts.

A search space is a set of candidate PDCCHs formed by CCEs at a given aggregation level, which the UE is supposed to attempt to decode. Aggregation levels and the number of PDCCH candidates for each aggregation level may be defined as follows.

TABLE 4

| | Search space | | Number of PDCCH candidates |
|---|---|---|---|
| | Aggregation level | Size (in CCEs) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As noted from [Table 4], there are four aggregation levels and thus the UE has a plurality of search spaces at each aggregation level. Search spaces may be classified into a UE-specific Search Space (USS) and a Common Search Space (CSS). The USS is configured for specific UEs. Each of the UEs may monitor the USS (may attempt to decode a set of PDCCH candidates according to possible DCI formats) and verify an RNTI masked with a PDCCH and a CRC of the PDCCH. If the RNTI and CRC are valid, the UE may acquire control information from the PDCCH.

The CSS is designed for the case where a plurality of UEs or all UEs need to receive a PDCCH, for example, for dynamic scheduling of system information or a paging message. Nonetheless, the CSS may be used for a specific UE depending on resource management. The CSS may overlap with the USS.

A search space may be determined by [Equation 3].

$$L\{(Y_k + m') \bmod \lfloor N_{CCE,k}/L \rfloor\} + i$$ [Equation 3]

where L is an aggregation level and $Y_k$ is a variable determined by an RNTI and subframe number k. m' is the number of PDCCH candidates. If CA is used, $m'=m+M^{(L)} \cdot n_{C_i}$ and otherwise, m'=m. Herein, m=0, . . . , $M^{(L)}-1$ where $M^{(L)}$ is the number of PDCCH candidates. $N_{CCE,k}$ is the total number of CCEs in the control region of a $k^{th}$ subframe and i indicates an individual CCE in a PDCCH candidate (i=0, . . . , L−1). In the CSS, $Y_k$ is always 0.

Figure 10:
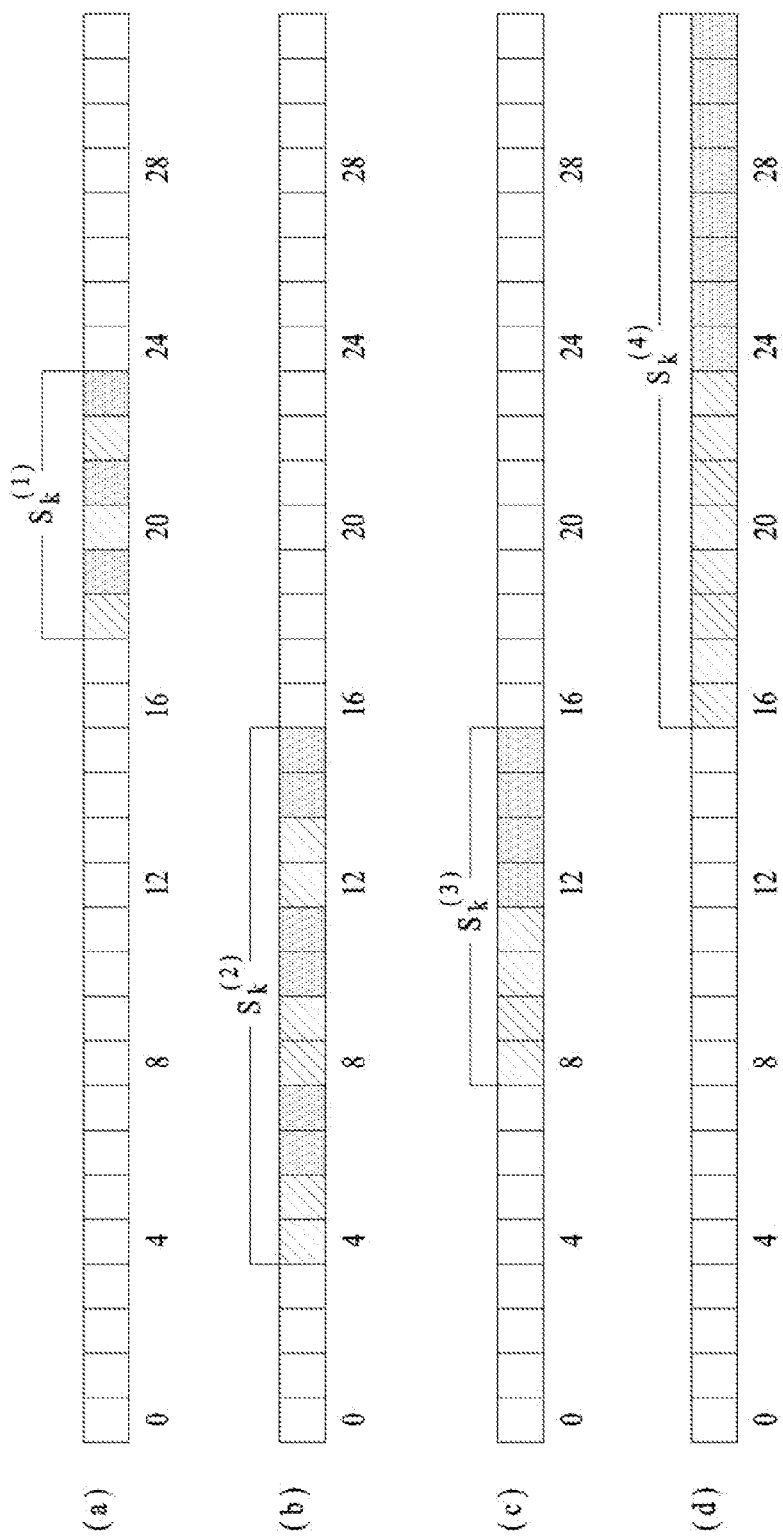
FIG. 10 illustrates a search space for each aggregation level.

FIG. 10 illustrates a USS (shaded) at each aggregation level, as defined by [Equation 3]. Herein, CA is not adopted and $N_{CCE,k}$ is set to 32, for the convenience of description.

(a), (b), (c), and (d) of FIG. 10 illustrate USSs at aggregation levels 1, 2, 4, and 8, respectively. In FIG. 10, a number indicates a CCE number. As described before, the start CCE of a search space at each aggregation level is determined by an RNTI and subframe number k. For a UE, the start CCE of a search space may be different in the same subframe according to an aggregation level due to a modulo function and L. In addition, the start CCE of a search space is always a multiple of an aggregation level due to L. By way of example, $Y_k$ is CCE 18. The UE attempts to decode in units of CCEs determined by an aggregation level, starting from the start CCE. For example, the UE attempts to decode in units of two CCEs according to an aggregation level, starting from CCE 4 in (b) of FIG. 10.

In this manner, the UE attempts to decode a search space. The number of decodings is determined by a DCI format and a transmission mode indicated by Radio Resource Control (RRC) signaling. If CA is not used, the UE needs to attempt 12 decodings at maximum in a CSS, in consideration of two DCI sizes (DCI format 0/1A/3/3A and DCI format 1C) for each of six PDCCH candidates. In a USS, the UE needs to attempt 32 decodings at maximum, in consideration of two DCI sizes for each of 16 PDCCH candidates (6+6+2+2=16).

On the other hand, if CA is used, the maximum number of decodings is increased because as many decodings as the number of DL resources (DL Component Carriers (CCs)) are added for a USS and DCI format 4).

In the afore-described legacy LTE/LTE-A system, a UE receives DCI on a PDCCH transmitted in resources indicated by a PCFICH. In contrast, allocation of a new PDCCH having a new structure and transmitted in a new transmission mode to a PDSCH region is under discussion in a system conforming to LTE release-11 and beyond, in consideration of various cell deployment scenarios such as Remote Radio Heads (RRHs) and MIMO such as closed-loop beamforming based on a UE's feedback. Hereinbelow, the newly defined PDCCH will be referred to as an Enhanced PDCCH (E-PDCCH) and an existing PDCCH will be referred to as a legacy PDCCH or a PDCCH.

If the DL bandwidth $N_{RB}^{DL} \leq 10$, the legacy PDCCH is transmitted in the first to fourth OFDM symbols of a DL subframe, OFDM symbol 0 to OFDM symbol 3, and if the DL bandwidth $N_{RB}^{DL} > 10$, the legacy PDCCH is transmitted in the first to third OFDM symbols of the DL subframe, OFDM symbol 0 to OFDM symbol 2. The legacy PDCCH may be configured to span various ranges according to the type of a DL subframe (e.g. normal subframe, Multicast Broadcast Single Frequency Network (MBSFN) subframe, special subframe, etc.) and a PHICH duration as well as a system bandwidth. A CFI indicating the range of the legacy PDCCH is signaled to a UE by a PCFICH in each DL subframe. The range of a PDCCH indicated by a CFI transmitted on a PCFICH is determined as illustrated in [Table 5]. One thing to note herein is that a PHICH duration indicated by a PBCH determines a lower limit of the PDCCH range. Accordingly, if $N_{RB}^{DL} > 10$ and an extended PHICH duration is configured, the UE operates on the assumption that the CFI is identical to the extended PHICH duration.

TABLE 5

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

TABLE 6

| PHICH duration | Non-MBSFN subframes | | MBSFN subframes on a carrier supporting PDSCH |
|---|---|---|---|
| | Subframes 1 and 6 in case of frame structure type 2 | All other cases | |
| Normal | 1 | 1 | 1 |
| Extended | 2 | 3 | 2 |

As described above, the PDCCH starts from the first OFDM symbol (OFDM symbol 0) of a subframe and the range/size of the PDCCH is determined according to the type of the subframe and a PHICH duration in the legacy LTE/LTE-A system. If the E-PDCCH is introduced, the index of the start symbol of a resource region carrying the E-PDCCH may vary according to a carrier type, legacy control channels, or transmission or non-transmission of new control channels (e.g. Enhanced PHICH (E-PHICH), Enhanced PCFICH (E-PCFICH), etc.) related to the E-PDCCH. Accordingly, there is a need for defining the start OFDM symbol (or the start OFDM symbol index) of a resource region carrying an E-PDCCH so that a UE may receive the E-PDCCH. Now, a description will be given of methods for determining the start OFDM symbol (or a start OFDM symbol index) of an E-DPCCH.

Embodiment 1

The start OFDM symbol of an E-PDCCH may be determined by a function of a higher-layer parameter transmitted by UE-specific or cell-specific higher-layer signaling and the type of a DL subframe carrying the E-PDCCH.

The RRC parameter transmitted by UE-specific or cell-specific RRC signaling may be 'startOFDMsymbol'(the name of the parameter is exemplary). i) If $N_{RB}^{DL} \leq 10$, 'startOFDMsymbol' may be one of OFDM symbol index 0, 2, 3, or 4 and ii) if $N_{RB}^{DL} > 10$, 'startOFDMsymbol' may be one of OFDM symbol index 0, 1, 2, or 3. Specifically, 'startOFDMsymbol' may be configured as listed in [Table 7].

TABLE 7

| Configuration | startOFDMsymbol, when $N_{RB}^{DL} > 10$ | startOFDMsymbol, when $N_{RB}^{DL} \leq 10$ |
|---|---|---|
| 0 | 1 | 2 |
| 1 | 2 | 3 |
| 2 | 3 | 4 |
| 3 | 0 | 0 |

For example, in the case of 'startOFDMsymbol' configuration 3, 'startOFDMsymbol' may be 0 irrespective of the DL bandwidth is larger than 10 RBs or equal to or smaller than 10 RBs. Particularly, this case may apply to a new carrier type that may be defined after LTE release-11.

The actual start OFDM symbol of the E-PDCCH may be determined based on 'startOFDMsymbol' configured in the above manner, a system bandwidth, and a subframe type, as illustrated in [Table 8].

TABLE 8

| Subframe | Start OFDM symbol index for E-PDCCH when $N_{RB}^{DL} > 10$ | Start OFDM symbol index for E-PDCCH when $N_{RB}^{DL} \leq 10$ |
|---|---|---|
| Subframe 1 and 6 for frame structure type 2 | # min(2, startOFDMsymbol) | #2 |
| MBSFN subframes on a carrier supporting PDSCH, configured with 1 or 2 cell-specific antenna ports | # min(2, startOFDMsymbol) | #2 |
| MBSFN subframes on a carrier supporting PDSCH, configured with 4 cell-specific antenna ports | #2 | #2 |
| Subframes on a carrier not supporting PDSCH | N/A | N/A |
| Non-MBSFN subframes (except subframe 6 for frame structure type 2) configured with positioning reference signals | # startOFDMsymbol | # min(3, startOFDMsymbol) |
| All other cases(including subframe on a new carrier for rel-11 supporting PDSCH) | # startOFDMsymbol | # startOFDMsymbol |

Referring to [Table 8], for example, if a normal subframe carries the E-PDCCH, the start OFDM symbol index of the E-PDCCH may be set to 'startOFDMsymbol' indicated by higher-layer signaling. If a special subframe or an MBSFN subframe carries the E-PDCCH and the DL bandwidth is larger than 10 RBs, the start OFDM symbol index of the E-PDCCH may be set to the smaller value between 2 and 'startOFDMsymbol'. If a special subframe or an MBSFN subframe carries the E-PDCCH and the DL bandwidth is equal to or smaller than 10 RBs, the start OFDM symbol index of the E-PDCCH may be set to 2.

In another example, a parameter that configures the start OFDM symbol of the E-PDCCH may be transmitted for each subframe type.

For example, in frame structure type 1, the start OFDM symbol configuration parameter ('startOFDMsymbol') may be configured separately into a start OFDM symbol configuration parameter ('startOFDMsymbolnonMBSFN') for a non-MBSFN subframe and a start OFDM symbol configuration parameter ('startOFDMsymbolMBSFN') for an MBSFN subframe. In this case, the start OFDM symbol index of an E-PDCCH in a non-MBSFN subframe may be determined by 'startOFDMsymbolnonMBSFN', whereas the start OFDM symbol index of an E-PDCCH in an MBSFN subframe may be determined by 'startOFDMsymbolMBSFN'.

In frame structure type 2, start OFDM symbol configuration parameters may be configured respectively for three types of subframes, non-MBSFN subframe, normal subframe, and special subframe. That is, the start OFDM symbol index of an E-PDCCH in an MBSFN subframe may be determined by 'startOFDMsymbolMBSFN'. In the case of a non-MBSFN subframe, the start OFDM symbol index of an E-PDCCH in a normal subframe may be determined by 'startOFDMsymbolnormal' and the start OFDM symbol index of an E-PDCCH in a special subframe may be determined by 'startOFDMsymbolspecial'.

While a single RRC parameter ('startOFDMsymbol') is configured to indicate the start OFDM symbol of an E-PDCCH in [Table 8], two RRC parameters 'startOFDMsymbol1' and 'startOFDMsymbol2' may be configured and a value between the two parameters may be selected for each subframe, referring to a mapping table such as [Table 9] below.

TABLE 9

| Subframe | Start OFDM symbol index for E-PDCCH when $N_{RB}^{DL} > 10$ | Start OFDM symbol index for E-PDCCH when $N_{RB}^{DL} \leq 10$ |
|---|---|---|
| Subframe 1 and 6 for frame structure type 2 | # startOFDMsymbol1 | #2 |
| MBSFN subframes on a carrier supporting PDSCH, configured with 1 or 2 cell-specific antenna ports | # startOFDMsymbol1 | #2 |
| MBSFN subframes on a carrier supporting PDSCH, configured with 4 cell-specific antenna ports | #2 | #2 |

TABLE 9-continued

| Subframe | Start OFDM symbol index for E-PDCCH when $N_{RB}^{DL} > 10$ | Start OFDM symbol index for E-PDCCH when $N_{RB}^{DL} \leq 10$ |
|---|---|---|
| Subframes on a carrier not supporting PDSCH | N/A | N/A |
| Non-MBSFN subframes (except subframe 6 for frame structure type 2) configured with positioning reference signals | # startOFDMsymbol2 | # startOFDMsymbol1 |
| All other cases(including subframe on a new carrier for rel-11 supporting PDSCH) | # startOFDMsymbol2 | # startOFDMsymbol2 |

In [Table 8] and [Table 9], if a legacy PHICH is transmitted on a carrier carrying an E-PDCCH, a PHICH duration configured by higher-layer signaling may impose a lower limit on the start OFDM symbol index of the E-PDCCH. That is, in the case of a normal PHICH duration, the E-PDCCH may start from OFDM symbol 1. In the case of an extended PHICH duration, the E-PDCCH may start from OFDM symbol 2 or OFDM symbol 3 according to a subframe type, as illustrated in [Table 2].

Or the start OFDM symbol of the E-PDCCH may not be affected by a PHICH duration. Rather, the start OFDM symbol of the E-PDCCH may be determined based on the higher-layer configuration parameter 'startOFDMsymbol' and a subframe type, referring to only [Table 8] or [Table 9].

Embodiment 2

In another embodiment of the present invention, the start OFDM symbol of an E-PDCCH is fixed to a predetermined position. The start OFDM symbol position of the E-PDCCH may be determined separately for a backward compatible carrier carrying a legacy PDCCH and a new carrier without a legacy PDCCH, which may be defined after LTE release-11.

The start OFDM symbol of an E-PDCCH may be determined to be the first OFDM symbol of a subframe in the new carrier, irrespective of a DL bandwidth on the assumption that the new carrier does not carry a legacy control channel. Or if $N_{RB}^{DL}>10$ by UE-specific or cell-specific higher-layer signaling, the start OFDM symbol of an E-PDCCH may be determined to be one of OFDM symbol #0, #1, #2, or #3 and if $N_{RB}^{DL} \leq 10$ by UE-specific or cell-specific higher-layer signaling, the start OFDM symbol of an E-PDCCH may be determined to be one of OFDM symbol #0, #2, #3, or #4.

In the case of a backward-compatible carrier, start OFDM symbol indexes for an E-PDCCH may be configured as illustrated in [Table 10] in consideration of a maximum size of a legacy PDCCH determined based on a system bandwidth and a subframe type.

TABLE 10

| Carrier type | Subframe | Start OFDM symbol index for E-PDCCH when $N_{RB}^{DL} > 10$ | Start OFDM symbol index for E-PDCCH when $N_{RB}^{DL} \leq 10$ |
|---|---|---|---|
| Backward compatible carrier | Subframe 1 and 6 for frame structure type 2 | #2 | #2 |
| | MBSFN subframes on a carrier supporting PDSCH, configured with 1 or 2 cell-specific antenna ports | #2 | #2 |
| | MBSFN subframes on a carrier supporting PDSCH, configured with 4 cell-specific antenna ports | #2 | #2 |
| | Subframes on a carrier not supporting PDSCH | N/A | N/A |
| | Non-MBSFN subframes (except subframe 6 for frame structure type 2) configured with positioning reference signals | #3 | #3 |
| | All other cases | #3 | #4 |
| New carrier for rel-11 | DL subframe and subframe 1 and 6 for frame structure type 2 | #0 | #0 |

Embodiment 3

In the case of a backward compatible carrier, the start OFDM symbol of an E-PDCCH may be determined based on the size of a legacy PDCCH, whereas in the case of a new carrier type, the start OFDM symbol of an E-PDCCH may be fixed to OFDM symbol 0 or determined by a higher-layer configuration. Compared to Embodiment 2 in which the start OFDM symbol of an E-PDCCH is determined based on the maximum size of a legacy PDCCH in the case of a backward compatible carrier, the start OFDM symbol of an E-PDCCH is determined in consideration of the actual size of a legacy PDCCH in the case of a backward compatible carrier. For this purpose, once a UE acquires information about a PHICH duration and information about the size of a legacy PDCCH from a PCFICH, the UE may set the start OFDM symbol of an E-PDCCH to the OFDM symbol next to an ending OFDM symbol of the legacy PDCCH.

Embodiment 4

A new CFI (hereinafter, referred to as an Enhanced CFI (E-CFI) distinguishably from a CFI for a legacy PDCCH) is defined to configure the start OFDM symbol of an E-PDCCH and transmitted on a new DL channel, E-PCFICH.

The E-PCFICH may be transmitted at a fixed position of a legacy PDCCH (specific CCEs, for example, 8 CCEs ranging from CCE 0 to CCE 8 or the last 8 CCEs of the legacy PDCCH). Or an E-PCFICH RNTI is newly defined and DCI with a CRC scrambled with the E-PCFICH RNTI is transmitted in a CSS of the legacy PDCCH, so that a UE may receive the E-PCFICH by blind decoding. Or the E-PCFICH may be transmitted in a specific RB of a PDSCH region. For example, the E-PCFICH may be transmitted in two PRBs at both edges of a total DL bandwidth. In addition to information about the start OFDM symbol of an E-PDCCH, an eNB may transmit RB allocation information about a CSS for an E-PDCCH or RB allocation information about a distributed E-PDCCH, on the E-PCFICH.

The eNB may configure the start OFDM symbol ('startOFDMsymbol') of an E-PDCCH through the E-PCFICH as illustrated in [Table 7].

Embodiment 5

If a CSS as well as a USS is configured in an E-PDCCH resource region, the start OFDM symbol of the E-PDCCH CSS may be preferably fixed to avoid ambiguity involved in a higher-layer configuration. Therefore, the present invention proposes that the start OFDM symbols of an E-PDCCH CSS and an E-PDCCH USS are defined individually/separately in order to configure the start OFDM symbol of an E-PDCCH. In other words, the start OFDM symbol of one or more RB pairs (PRB pairs and/or VRB pairs) in the CSS and the start OFDM symbol of one or more RB pairs in the USS are configured separately.

The start OFDM symbol of one or more RB pairs in the CSS may be fixed, especially in consideration of variable OFDM symbols occupied by a legacy control channel on a backward compatible carrier. For example, the start OFDM symbol may be set to a $4^{th}$ OFDM symbol, or may be fixed according to a subframe type as illustrated in [Table 10] in Embodiment 2.

The start OFDM symbol of one or more RB pairs in the USS may be determined according to any of Embodiment 1 to Embodiment 3.

Figure 11:
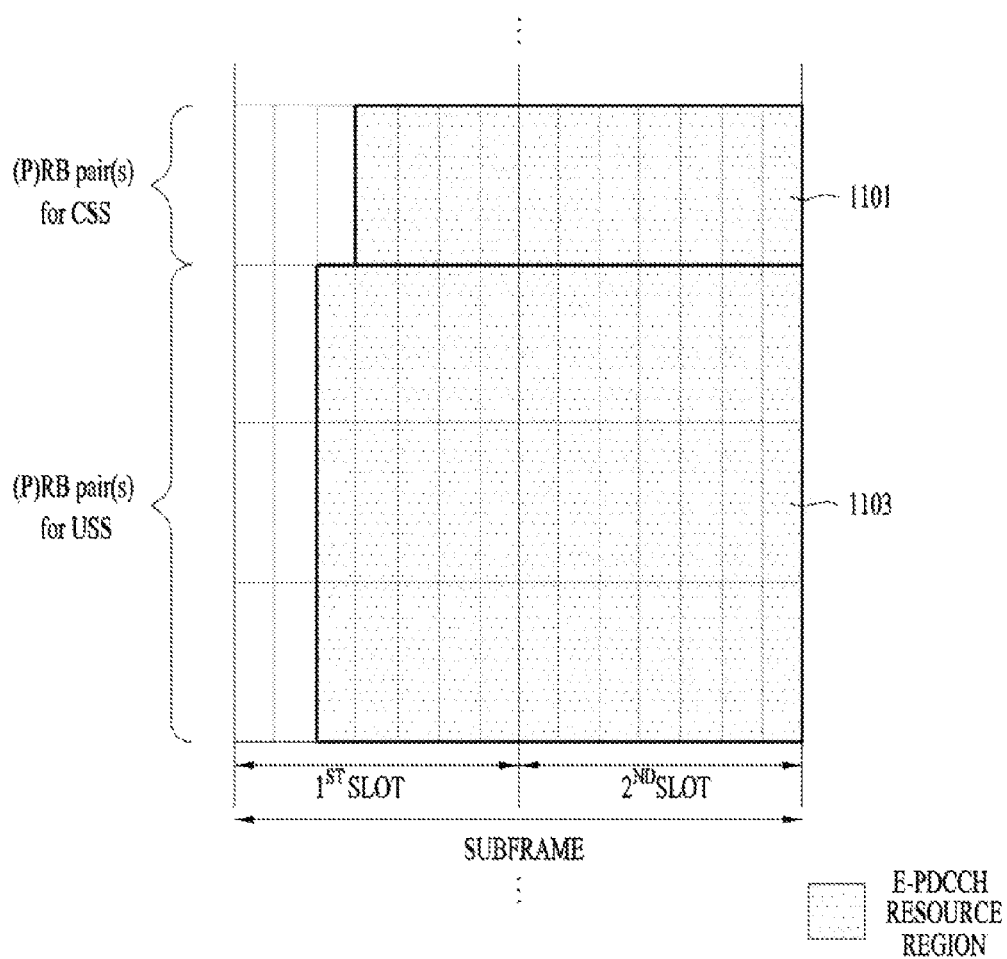
FIG. 11 illustrates determination of a starting Orthogonal Frequency Division Multiplexing (OFDM) symbol according to an embodiment of the present invention.

An example of Embodiment 5 will be described with reference to FIG. 11. In FIG. 11, one of four (P)RB pairs is used for a CSS and the other three (P)RB pairs are used for a USS. An E-PDCCH resource region 1101 including the CSS starts from a fourth OFDM symbol and an E-PDCCH resource region 1103 including the USS starts from a third OFDM symbol. Herein, the start OFDM symbol of the E-PDCCH resource region 1103 including the USS is configured according to [Table 8] in Embodiment 1. While the resource regions including the CSS and the USS start from different OFDM symbols in FIG. 11, the resource regions may start from the same OFDM symbol by implementing any of the foregoing embodiments.

Figure 12:
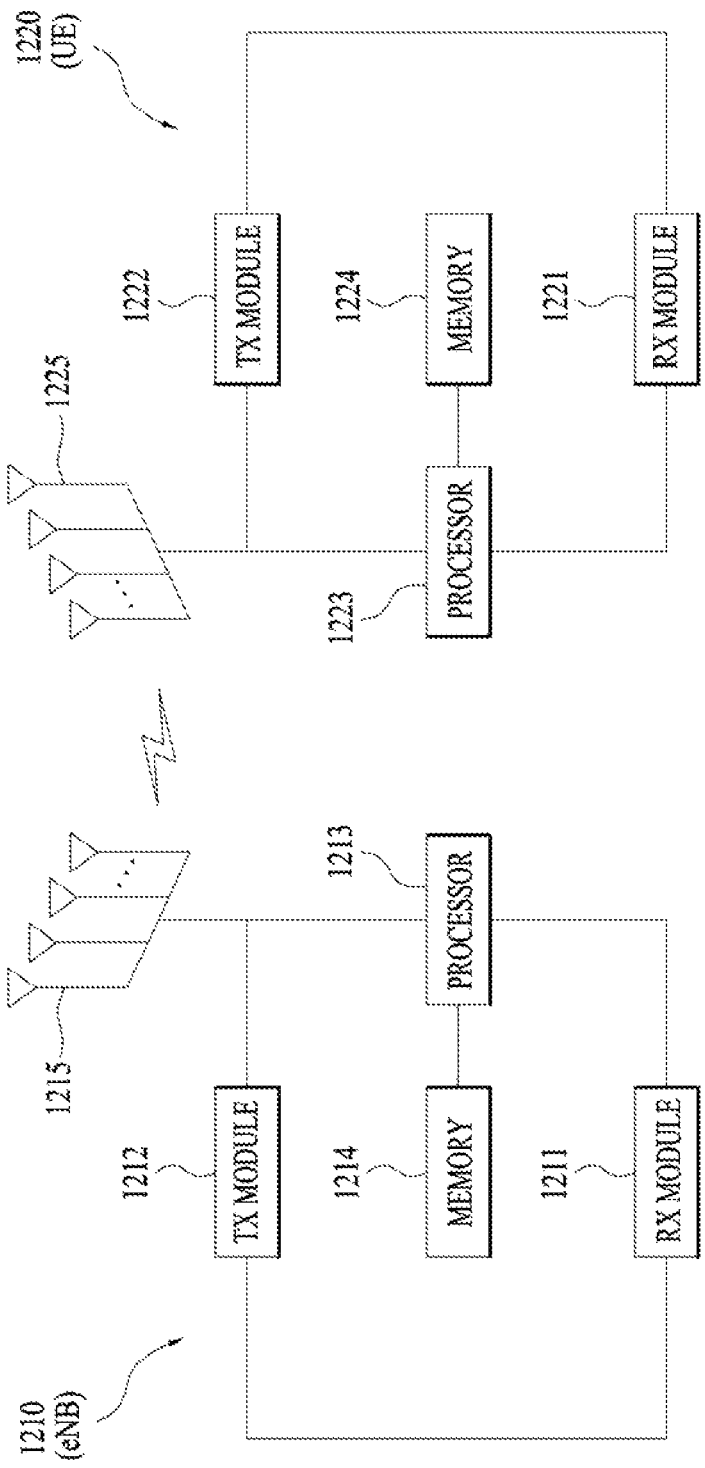
FIG. 12 is a block diagram of an evolved Node B (eNB) and a User Equipment (UE) according to the present invention.

FIG. 12 is a block diagram of an eNB and a UE according to an embodiment of the present invention.

Referring to FIG. 12, an eNB 1210 according to the present invention may include a Reception (Rx) module 1211, a Tx module 1212, a processor 1213, a memory 1214, and a plurality of antennas 1215. The plurality of antennas 1215 are used to support MIMO transmission and reception. The Rx module 1211 may receive UL signals, data and information from a UE. The Tx module 1212 may transmit DL signals, data and information to a UE. The processor 1213 may provide overall control to the operations of the eNB 1210 and operate to implement the foregoing embodiments of the present invention.

The processor 1213 may process information received by the eNB 1210 and information to be transmitted from the eNB 1210. The memory 1214 may store the processed information for a predetermined time and may be replaced with a component such as a buffer (not shown).

A UE 1220 according to the present invention may include an Rx module 1221, a Tx module 1222, a processor 1223, a memory 1224, and a plurality of antennas 1225. The plurality of antennas 1225 are used to support MIMO transmission and reception. The Rx module 1221 may receive DL signals, data, and information from an eNB. The Tx module 1222 may transmit UL signals, data, and information to an eNB. The processor 1223 may provide overall control to the operations of the UE 1220 and may implement the afore-described embodiments of the present invention.

The processor 1223 may process information received by the UE 1220 and information to be transmitted from the UE 1220. The memory 1224 may store the processed information for a predetermined time and may be replaced with a component such as a buffer (not shown).

One or more of the above-described embodiments of the present invention may apply to the configurations of the eNB and the UE, independently or in combination. Redundant descriptions are avoided for clarity.

The description of the eNB 1210 may apply to a relay as a DL transmission entity or a UL reception entity, and the description of the UE 1220 may apply to the relay as a DL reception entity or a UL transmission entity in FIG. 12.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

While the present invention has been described above in the context of a 3GPP LTE-series mobile communication system, the present invention may apply to various wireless communication systems based on the same or equivalent principle.

The invention claimed is:

1. A method for acquiring control information via an Enhanced Physical Downlink Control Channel (EPDCCH) at a User Equipment (UE) in a wireless communication system, the method comprising:
   determining an index of a start Orthogonal Frequency Division Multiplexing (OFDM) symbol of an EPDCCH in a subframe; and
   attempting to perform decoding on a UE-specific search space of the EPDCCH,
   wherein if the subframe is a subframe 1 or a subframe 6 for Time Division Duplexing (TDD), the index of the starting OFDM symbol is a smaller value between 2 and a higher-layer parameter which indicates the index of the starting OFDM symbol of the EPDCCH.

2. The method according to claim 1, wherein if the subframe is a Multicast-Broadcast Single Frequency Network (MBSFN) subframe, the index of the starting OFDM symbol is a smaller value between 2 and the higher-layer parameter.

3. The method according to claim 2, wherein the subframe is configured with one or two antenna ports.

4. The method according to claim 2, wherein if the subframe is a non-MBSFN subframe, the index of the starting OFDM symbol is the higher-layer parameter.

5. The method according to claim 1 wherein if the subframe is a subframe other than the subframe 1 and the subframe 6, the index of the starting OFDM symbol is the higher-layer parameter.

6. A method for transmitting control information on an Enhanced Physical Downlink Control Channel (EPDCCH) at a Base Station (BS) in a wireless communication system, the method comprising:
   determining an index of a start Orthogonal Frequency Division Multiplexing (OFDM) symbol of an EPDCCH in a subframe; and
   allocating the EPDCCH to a UE-specific search space of the EPDCCH,
   wherein if the subframe is a subframe 1 or a subframe 6 for Time Division Duplexing (TDD), the index of the starting OFDM symbol is a smaller value between 2 and a higher-layer parameter which indicates the index of the starting OFDM symbol of the EPDCCH.

7. The method according to claim 6, wherein if the subframe is a Multicast-Broadcast Single Frequency Network (MBSFN) subframe, the index of the starting OFDM symbol is a smaller value between 2 and the higher-layer parameter.

8. The method according to claim 7, wherein the subframe is configured with one or two antenna ports.

9. The method according to claim 7, wherein if the subframe is a non-MBSFN subframe, the index of the starting OFDM symbol is the higher-layer parameter.

10. The method according to claim 6, wherein if the subframe is a subframe other than the subframe 1 and the subframe 6, the index of the starting OFDM symbol is the higher-layer parameter.

11. A User Equipment (UE) for acquiring control information on an Enhanced Physical Downlink Control Channel (EPDCCH) in a wireless communication system, the UE comprising:
    a reception module; and
    a processor,
    wherein the processor determines an index of a start Orthogonal Frequency Division Multiplexing (OFDM) symbol of an EPDCCH in a subframe and attempts to perform decoding on a UE-specific search space of the EPDCCH, wherein if the subframe is a subframe 1 or a subframe 6 for Time Division Duplexing (TDD), the index of the starting OFDM symbol is a smaller value between 2 and a higher-layer parameter which indicates the index of the starting OFDM symbol of the EPDCCH.

12. A Base Station (BS) for transmitting control information on an Enhanced Physical Downlink Control Channel (EPDCCH) in a wireless communication system, the BS comprising:
    a transmission module; and
    a processor,
    wherein the processor determines an index of a start Orthogonal Frequency Division Multiplexing (OFDM) symbol of an EPDCCH in a subframe and allocates the EPDCCH to a UE-specific search space of the EPDCCH, wherein if the subframe is a subframe 1 or a subframe 6 for Time Division Duplexing (TDD), the index of the starting OFDM symbol is a smaller value between 2 and a higher-layer parameter which indicates the index of the starting OFDM symbol of the EPDCCH.

* * * * *